(12) United States Patent
Chen et al.

(10) Patent No.: US 10,266,765 B2
(45) Date of Patent: Apr. 23, 2019

(54) EUROPIUM-DOPED PHOSPHOR MATERIALS

(71) Applicant: The Board of Regents of the University of Texas System, Austin, TX (US)

(72) Inventors: Wei Chen, Arlington, TX (US); Lun Ma, Arlington, TX (US)

(73) Assignee: The Board of Regents of the University of Texas System, Austin, TX (US)

( * ) Notice: Subject to any disclaimer, the term of this patent is extended or adjusted under 35 U.S.C. 154(b) by 215 days.

(21) Appl. No.: 15/034,124

(22) PCT Filed: Nov. 6, 2014

(86) PCT No.: PCT/US2014/064415
§ 371 (c)(1),
(2) Date: May 3, 2016

(87) PCT Pub. No.: WO2015/112229
PCT Pub. Date: Jul. 30, 2015

(65) Prior Publication Data
US 2016/0264861 A1    Sep. 15, 2016

Related U.S. Application Data

(60) Provisional application No. 61/931,436, filed on Jan. 24, 2014, provisional application No. 61/900,750, filed on Nov. 6, 2013.

(51) Int. Cl.
C09K 11/77 (2006.01)

(52) U.S. Cl.
CPC .................................. C09K 11/773 (2013.01)

(58) Field of Classification Search
CPC ...................................................... C09K 11/773
See application file for complete search history.

(56) References Cited

PUBLICATIONS

Hossu et al, "On the luminescence enhancement of Mn2+ by co-doping of Eu+2 in ZnS:Mn,Eu", Optical Materials, 35, Apr. 24, 2013, pp. 1513-1519.*
Hossu et al., On the luminescence enhancement of Mn2+ by co-doping of Eu2+ in ZnS:Mn,Eu, Optical Materials, vol. 35, pp. 1513-1519 (2013).

* cited by examiner

*Primary Examiner* — C Melissa Koslow
(74) *Attorney, Agent, or Firm* — Winstead PC

(57) ABSTRACT

This invention relates to new phosphor materials exhibiting luminescence and methods for their production. More particularly, the invention relates to new europium-doped zinc sulfide-manganese (ZnS:Mn,Eu) phosphors and use thereof for radiation detection.

8 Claims, 18 Drawing Sheets

EUROPIUM-DOPED PHOSPHOR MATERIALS

CROSS-REFERENCES TO RELATED APPLICATIONS

This Application is the 35 USC 371 national stage application of PCT/US14/64415 filed Nov. 6, 2014, which claims the benefit under 35 U.S.C. § 119(e) of U.S. Patent Application No. 61/900,750 filed Nov. 6, 2013 and U.S. Patent Application No. 61/931,436 filed Jan. 24, 2014, which are incorporated herein by reference in their entirety as if fully set forth herein.

STATEMENT REGARDING FEDERALLY-SPONSORED RESEARCH OR DEVELOPMENT

This invention was made with government support under the NSF and DHS joint ARI program (2011-DN-077-ARI053-02, -03 and -04, CBET-1039068), DOD DTRA08-005, and the U.S. Army Medical Research Acquisition Activity (USAMRAA) under Grant Nos. W81XWH-10-1-0279 and W81XWH-10-1-0234. The government has certain rights in the invention.

TECHNICAL FIELD

The invention relates to phosphor materials that exhibit luminescence and methods for their production. More particularly, the invention relates to new europium-doped zinc sulfide-manganese (ZnS:Mn,Eu) phosphors and their use thereof as luminescent materials. A new and intense violet emission at 420 nm is observed in ZnS:Mn,Eu that is related to $Eu^{2+}$ doping but only appears at certain $Eu^{2+}$ concentrations. The intensity of the 420 nm violet fluorescence is found to be X-ray dose-dependent, while the red fluorescence of 583 nm due to the d-d transition of Mn ions is not. The intense emission provides a violet light for solid state lighting and also offers a very sensitive method for radiation detection.

BACKGROUND OF THE INVENTION

Photoluminescence or fluorescence is the light emission caused by light excitation. Electroluminescence occurs by the emission of light from a phosphor in response to a sufficiently high electric field developed across the phosphor. Phosphor refers to those materials that emit light in response to the application of a field across the material. Thin film electroluminescent devices have a basic structure comprising a phosphor film or layer sandwiched between two electrodes. Scintillation or radioluminescence is the emission of light excited by high energy particles, beam or radiation rays like X-ray, Gamma- or Beta rays. Cathodoluminescence is a luminescence phenomenon excited by electron beams. The invented phosphors can be used for all these kinds of luminescence in applications for solid state lighting, display, detection and sensing.

There is strong commercial interest in achieving a wide spectral range in electroluminescent phosphors for visible display application and in particular for making color flat panel displays. $Mn^{2+}$ doped zinc sulfide (ZnS:Mn) phosphor is perhaps the most studied phosphor due to its potential applications in solid state lighting, displays and sensing technologies. ZnS is a direct transition semiconductor with the largest band gap among II-VI compounds, and is an excellent host for doped phosphors. In ZnS:Mn, Mn is isovalent, having the same valence as the host cation, and therefore, $Mn^{2+}$ ions can substitute the $Zn^{2+}$ sites without producing any obvious defects or vacancies. The chemical bonding characteristics of $Mn^{2+}$ and $Zn^{2+}$ are expected to be similar since they have a common ionization state and, hence valence. Thus, a $Mn^{2+}$ luminescence center in ZnS:Mn is electronically neutral in the lattice in equilibrium, and this makes ZnS:Mn an ideal phosphor with intense photoluminescence, electroluminescence, upconversion luminescence and triboluminescence.

In addition to the excellent luminescence properties, ZnS:Mn is very stable and easy to synthesize. The $Mn^{2+}$ ionization energy has been reported to be 3.0 eV to 3.5 eV below the valence band maximum. Since the ionization energy of $Mn^{2+}$ is large, it is not usually ionized under normal operation in electroluminescence devices. These characteristics make ZnS:Mn an ideal phosphor for practical applications. Therefore, ZnS:Mn is one of the most widely investigated doped phosphors, not only in bulk but also as nanoparticles.

ZnS:Mn has two shortcomings in terms of practical applications. As the emission is from the d-d transition of $Mn^{2+}$, which is forbidden, the resulting luminescence is not very efficient and the luminescence lifetime is long (millisecond range). Efforts have been made to solve these two challenges by preparing nanosized particles of ZnS:Mn. It was predicted that the quantum size effect may shorten the luminescence lifetime and increase the luminescence efficiency. Indeed, it has been reported that the luminescence lifetime of $Mn^{2+}$ in ZnS:Mn nanoparticles changed from milliseconds in the bulk to nanoseconds in nanoparticles. However, it was later determined that the shortening is most likely due to the lifetime components from defects or surface states. Many methods have been successfully applied to enhance the luminescence of ZnS:Mn nanoparticles, such as surface passivation with polymers or silica, encapsulation in zeolites, and surface plasmon coupling. Therefore, it would be desirable to enhance the luminescence intensity of $Mn^{2+}$ in ZnS phosphors by simply co-doping with $Eu^{2+}$ ions, and explore their applications as a new phosphor and investigate the mechanisms responsible for the enhancement.

As a sensitive method, fluorescence detection has been extensively studied and used since early years of last century. Among those detection methods, fluorescence intensity ratio (FIR) is an advanced technology based on the relative intensity changes of two emissions rather than the only change in one emission peak. This advantage makes it independent of the local concentration of fluorescence probe. Thus, the FIR is very reliable and has found its applications in a variety of sensing and detection fields, such as temperature measurement, biological sensing, and trace water detection. However, it has been rarely applied for radiation detection. Currently, most radiation detections are based on the detection of light or electric signals induced by radiation. A ratio monitoring of two radiation-dependent emission intensity changes would be a sensitive and reliable method for radiation detection. Changes in the emissions of $Eu^{2+}$- and $Mn^{2+}$-doped $CaF_2$ and $MgF_2$ phosphors can be used for radiation detection Zinc sulfide (ZnS) is a simple and widely used host material that has excellent capability to be doped with multiple metal ions. Doped ZnS phosphors are able to emit light in a wide range of wavelengths.

SUMMARY OF THE INVENTION

The invention provides new phosphor materials exhibiting luminescence based on ZnS:Mn,Eu materials.

In a preferred embodiment, the invention provides a ZnS:Mn, Eu-doped material wherein the compositions are: $Zn_xS:Mn_yEu_z^{2+}$, where $0<x<1$; $0<y<1$; $0<z<1$ and $x+y+z$ equals 1, and y, z and y+z are present in an amount less than 0.5.

BRIEF DESCRIPTION OF THE DRAWINGS

Preferred embodiments of the invention will now be described, by way of example only, with reference to the drawings, in which.

DESCRIPTION OF EXEMPLARY EMBODIMENTS

Embodiments of the invention are directed to a ZnS:Mn, Eu co-doped phosphor material. In an embodiment of the invention, the photoluminescence of the ZnS:Mn,Eu material is enhanced about 5.5-fold relative to the undoped control material. In a further embodiment of the invention, the X-ray luminescence is enhanced about 2.5-fold relative to ZnS:Mn. The co-doping of $Eu^{2+}$ into ZnS:Mn does not change the ratio of the wurtzite and zinc blend phases or the $Mn^{2+}$ luminescence lifetime in the samples. An embodiment of the invention provides a ZnS:Mn,Eu co-doped phosphor material, wherein the energy transfer and the phonon modification by $Eu^{2+}$ enhance the intensity of $Mn^{2+}$ emission. In certain embodiments, the concentration of the $Eu^{2+}$ ions ranges from 0.05% to 10%.

Zinc sulfide (ZnS, 99.99%), Manganese chloride ($MnCl_2$, 99%+), and Europium chloride ($EuCl_2$, 99.99%) were purchased from Sigma-Aldrich in USA. All the chemicals were used as obtained. The ZnS:Mn,Eu, ZnS:Mn, and ZnS:Eu phosphors are prepared using solid-state diffusion method. Briefly, calculated amounts of ZnS, $MnCl_2$ and/or $EuCl_2$ were ground together thoroughly and loaded into ceramic crucibles. The crucibles were then be embedded in carbon charcoal and sintered at 800° C. for 3 hours before cooled to room temperature.

The identity, crystalline structure, size of the ZnS:Mn,Eu phosphors were observed by X-ray diffraction (XRD) and transmission electron microscopy (TEM). The X-ray powder diffraction was recorded in a Rigaku Ultima IV X-ray diffractometer with a radiation beam of λ=1.5406 Å. The ZnS:Mn,Eu phosphors were first dispersed in pure water and then placed onto holey carbon-covered copper grids for TEM observations. The TEM images of the particles were obtained with a Hitachi 9500 electron microscope with accelerating voltage of 300 kV. The photoluminescence spectra were measured by using a Shimadzu RF-5301PC fluorescence spectrophotometer. The X-ray radiation was performed using a Faxitron RX-650 (Faxitron X-ray Corp, IL, USA) cabinet X-ray system. Luminescence decay curves were collected using a nanosecond optical parametric oscillator/amplifier (Spectra-Physics MOPO-730) operating at a 10 Hz repetition rate and tunable between 440 and 1800 nm. The output of the MOPO system was frequency doubled in a KDP crystal and directed onto the particles. Emission was collected at right angles to the excitation and focused into a ⅛-meter monochromator equipped with a standard photomultiplier tube. Raman spectra were recorded with a Horiba Jobin Yvon LabRAM Aramis Raman Spectrometer with laser excitation at 472.97 nm Electron Spin Resonance (ESR) spectra were measured on Bruker EMX spectrometer operating at 9.8 GHz. Spectral intensities are scaled per unit mass for comparison. All measurements were carried out at room temperature.

Figure 1:
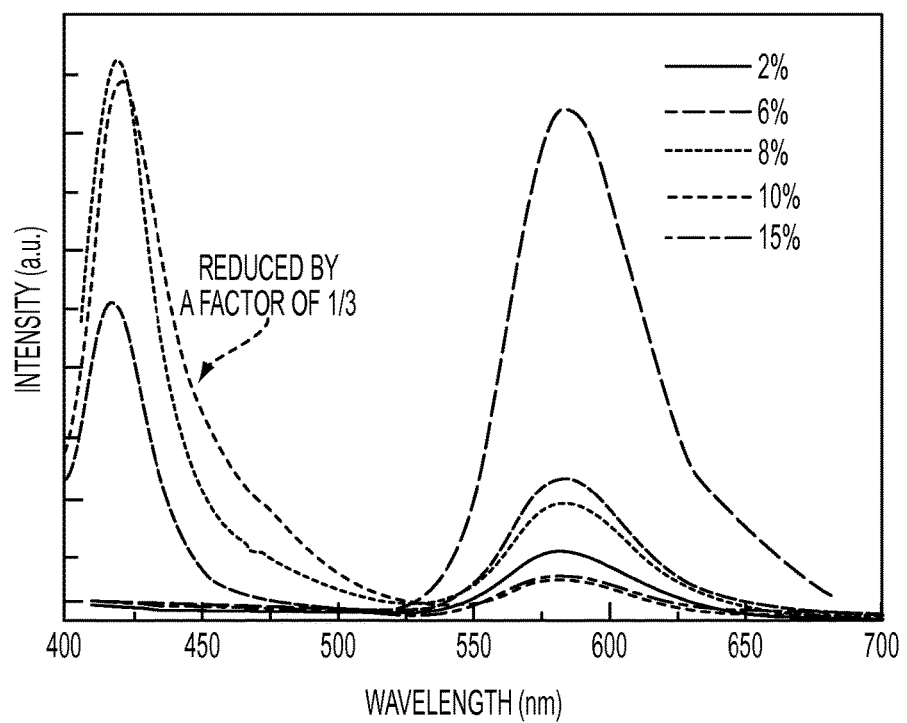
FIG. 1 shows the photoluminescence spectra of ZnS:Mn, Eu with Eu concentrations (2%, 4%, 6%, 8% 10%, and 15%) by excitation at 390 nm. The spectrum of ZnS:Mn,Eu(10%) has been reduced by a factor of ⅓. The dash curve is the spectrum of ZnS:Mn by its best excitation (346 nm). The Mn concentration is always 2%.

FIG. 1 shows the photoluminescence spectra of ZnS:Mn, Eu phosphors with various Eu concentrations (2%, 6%, 8% 10%, and 15%) under 390 nm excitation. The Mn concentration is 2% for all samples. The red emission at 583 nm is from $Mn^4T_1$-$^6A_1$ transition and is observed for all the samples. Its intensity gradually increases when $Eu^{2+}$ concentration increases from 2% to 6%, then continuously drops when the $Eu^{2+}$ concentration increases to 8%, 10%, and 15%. Remarkably, an intense and narrow (FWHM=30 nm) violet emission appears at about 420 nm with $Eu^{2+}$ concentrations of 6%, 8% and 10%. This emission peak slightly shifts from 417 nm to 420 nm with increasing $Eu^{2+}$ concentration. Its intensity increases gradually with increasing $Eu^{2+}$ and reaches its maximum at the $Eu^{2+}$ concentration of 10% where the emission is about 13 times stronger than the $Mn^{2+}$ emission of 583 nm. With further increasing of $Eu^{2+}$, the 420 nm emission is quenched and disappeared. For intensity comparison, a sample of ZnS:Mn(2%) is prepared by the same method. The dash line in FIG. 1 displays the highest emission intensity that ZnS:Mn(2%) can reach by using the its best excitation (346 nm). It is seen that the intensity of the 420 nm emission from ZnS:Mn,Eu(10%) is still 3 times higher than it.

Figure 2:
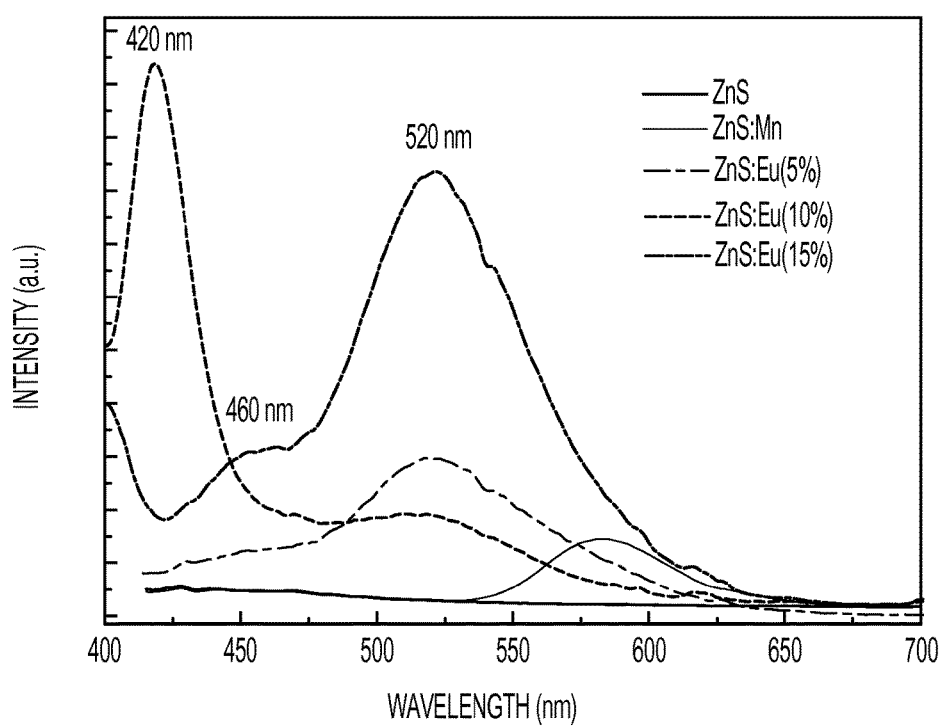
FIG. 2 shows the photoluminescence spectra of ZnS, ZnS:Mn (2%), and ZnS:Eu (5%, 10% and 15%) excited by 390 nm.

FIG. 2 displays the emission spectra of ZnS, ZnS:Mn (2%), and ZnS:Eu that were synthesized under the same conditions. It can be seen that pure ZnS has almost no emission or a very weak and broad emission band centered at about 460 nm due to defects. The spectrum of ZnS:Mn overlaps with ZnS except its Mn emission at 583 nm, which is the same to the previous Mn emission in the ZnS:Mn,Eu samples. For ZnS:Eu(10%), an intensive emission appears at 420 nm which matches the violet emission displayed in the ZnS:Mn,Eu samples. A broad band emission band from blue to green at 520 nm is also observed from this sample. This emission band is much weaker comparing to the strong violet emission. Therefore, the intense violet emission from those ZnS:Mn,Eu samples is related to $Eu^{2+}$ doping in ZnS. Moreover, both ZnS:Eu(5%) and ZnS:Eu (15%) have only a blue emission centered at 460 nm and a green emission centered at 520 nm, there is no 420 nm violet emission found in these samples. Thus, the 420 nm emission occurs only at proper $Eu^{2+}$ doping concentrations from 6% to 10%.

Figure 3:
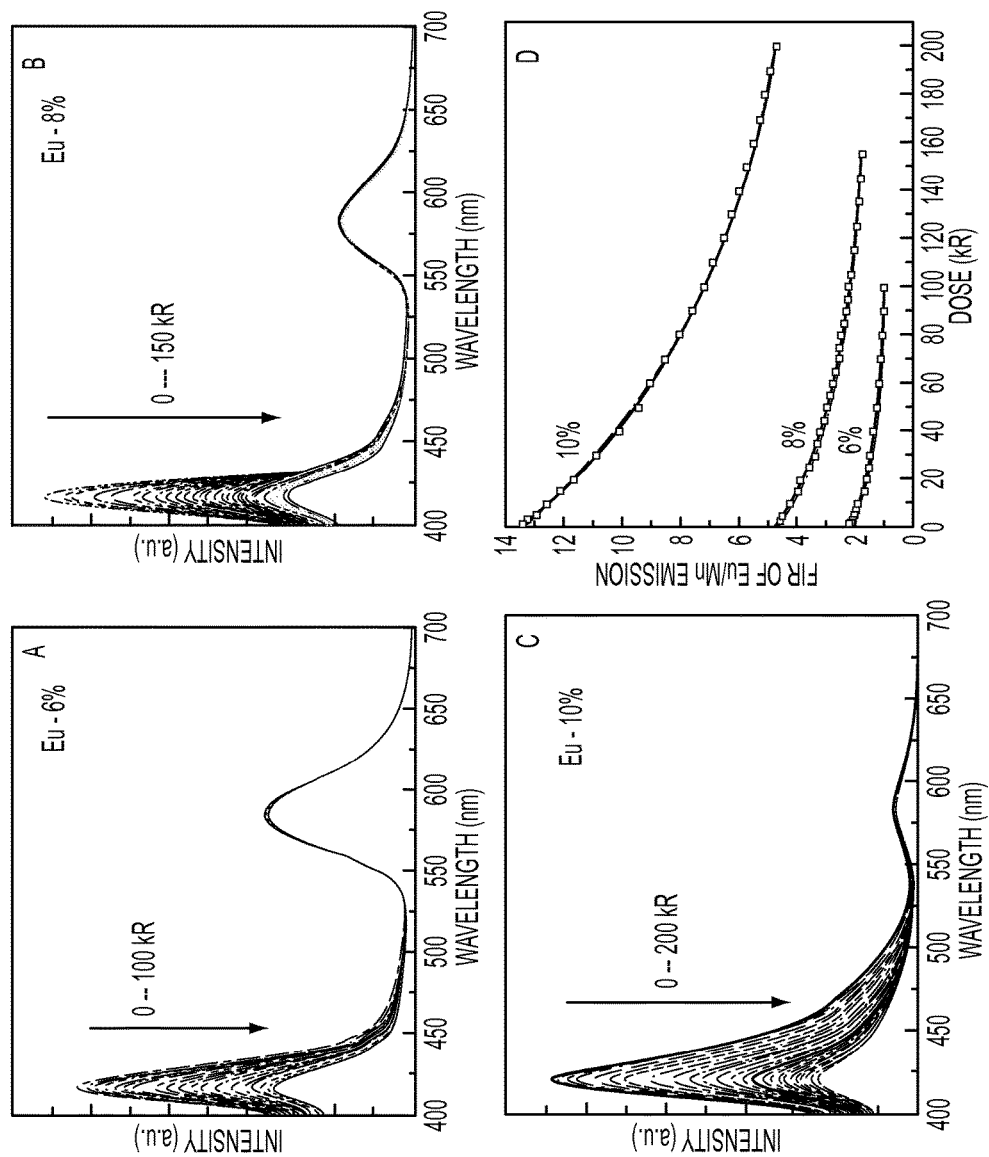
FIGS. 3A to 3D shows the radiation effects on Eu and Mn fluorescence emission in ZnS:Mn,Eu phosphors at Eu concentration (A) 6%, (B) 8%, and (C) 10%. FIRs of 420 nm emission/583 nm emission is plotted at different X-ray exposure doses (in black dots) and exponential fittings of the plots are in red curves as shown in (D)

Interestingly, the intensive violet emission is found sensitive to X-ray irradiation as shown in FIG. 3. As a UV excitation (390 nm) is used in the fluorescence measurement, its potential influence to ZnS:Mn,Eu fluorescence should be considered. We carefully measured the fluorescence spectra of ZnS:Mn, Eu samples using the UV excitation for more than 10 times, both emissions of 420 nm and 583 nm always remained constantly without any changes in their position and intensity. This means that the UV excitation used in fluorescence measurement does not affect the two emissions. However, when X-ray radiation is applied (i.e. the sample is exposed under X-ray), the intensity of 420 nm emission gradually decreases with increasing X-ray doses. Meanwhile, the 583 nm emission is observed remaining as the same. FIGS. 3a, 3b, and 3c display these observations with radiation exposure doses for sample A(ZnS:Mn,Eu(6%)), B(ZnS:Mn,Eu(8%)), and C(ZnS:Mn,Eu (10%)), respectively.

These fluorescence characters of the two emissions from ZnS:Mn,Eu phosphors can be used for radiation detection. It is known that an absolute fluorescence intensity may vary its value by many factors, such as measurement setups, concentrations and instruments. However, the intensity ratio of two emissions from a same sample relies only on the sample's intrinsic characters and consequently provides a reliable method for detections. Here, we use the FIR of 420 nm emission (violet)/583 nm emission (red) to indicate the X-ray radiation doses quantitatively. FIG. 3D shows the plots of FIRs of violet/red emissions as a function of X-ray dose. The experimental data are shown in black dots. Further curve fitting (in red) has found that FIRs are decreasing exponentially with X-ray doses. The fitting equations for sample A, B, and C are given as equation (1), (2), and (3), respectively.

$$FIR=1.28(\pm0.03)exp(-Rad/31.72(\pm1.90)+0.95(\pm0.03) \quad (1)$$

$$FIR=3.18(\pm0.04)exp(-Rad/62.94(\pm2.39))+1.50(\pm0.05) \quad (2)$$

$$FIR=10.26(\pm0.08)exp(-Rad/105.91(\pm1.94))+3.21(\pm0.09) \quad (3)$$

Where Rad is the radiation exposure dose, the values in brackets are standard deviations. We may then change the equation (1), (2) and (3) to (4), (5) and (6), respectively.

$$Rad=7.83-ln(FIR-0.95) \quad (4)$$

$$Rad=72.81-ln(FIR-1.50) \quad (5)$$

$$Rad=246.56-ln(FIR-3.21) \quad (6)$$

Thus, using the FIR by fluorescence measurement on ZnS:Mn,Eu, X-ray radiation doses can be calculated from above empirical equations.

Figure 4:
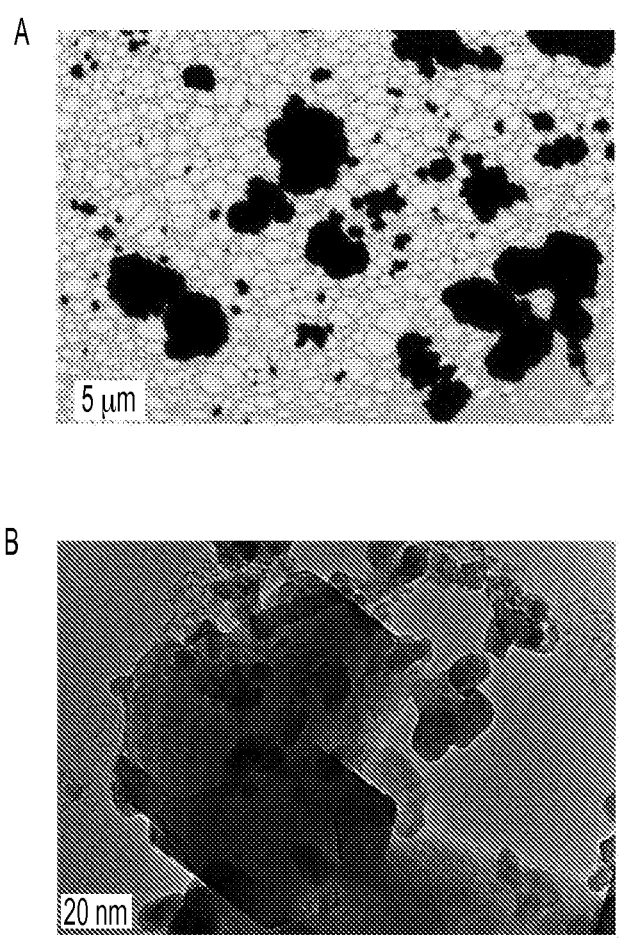
FIGS. 4A and 4B shows representative TEM images of ZnS:Mn,Eu phosphors. Both large size (about 5 microns) and nanoparticles of the ZnS:Mn,Eu phosphors are observed.

In bulk ZnS:Eu, the excited states of $Eu^{2+}$ is generally considered degenerated or even higher than its host conduction band, therefore $Eu^{2+}$ emission could not be observed in bulk ZnS:Eu materials. It has been reported that the intra-ion d-f transition from $Eu^{2+}$ in ZnS:$Eu^{2+}$ can be observed only in ZnS: $Eu^{2+}$ nanoparticles with size smaller than 3.5 nm. The TEM observations show that most of the ZnS:Mn,Eu phosphors are in the size of several micrometers. Some nanoparticles are seen in the samples by HRTEM but their size are larger than 20 nm. (FIG. 4). These indicate that the emission at 420 nm is not from the intra-ion d-f transition from $Eu^{2+}$ in ZnS:$Eu^{2+}$. In addition, ZnS: $Eu^{2+}$ nanoparticles usually found their green emission due to $Eu^{2+}$ $4f^65d^1$–$4f^7$ transition at about 530 nm A violet emission of 420 nm from $Eu^{2+}$ could be seen in other hosts but not in ZnS. Here, as shown in FIG. 2, the emissions of 420 nm, 460 nm and 520 nm should be related to $Eu^{2+}$ doping. ZnS may have defect emissions in those wavelength ranges due to sulfur or zinc defects. In this work, it is suggested that the $Eu^{2+}$ doping contributes on defect formations and enhance their emissions consequently. These $Eu^{2+}$ related defects are much more effective to emit light (7-30 times higher in emission intensities than ZnS defects shown in FIG. 2). Notably, the emission enhancement at 420 nm limits in a certain $Eu^{2+}$ doping level (e.g. 6% to 10%), as the 420 nm emission only shows up in the case of $Eu^{2+}$ concentration from 6% to 10%. While the emissions enhancement at 460 nm and 520 nm occur at all $Eu^{2+}$ concentrations.

Figure 5:
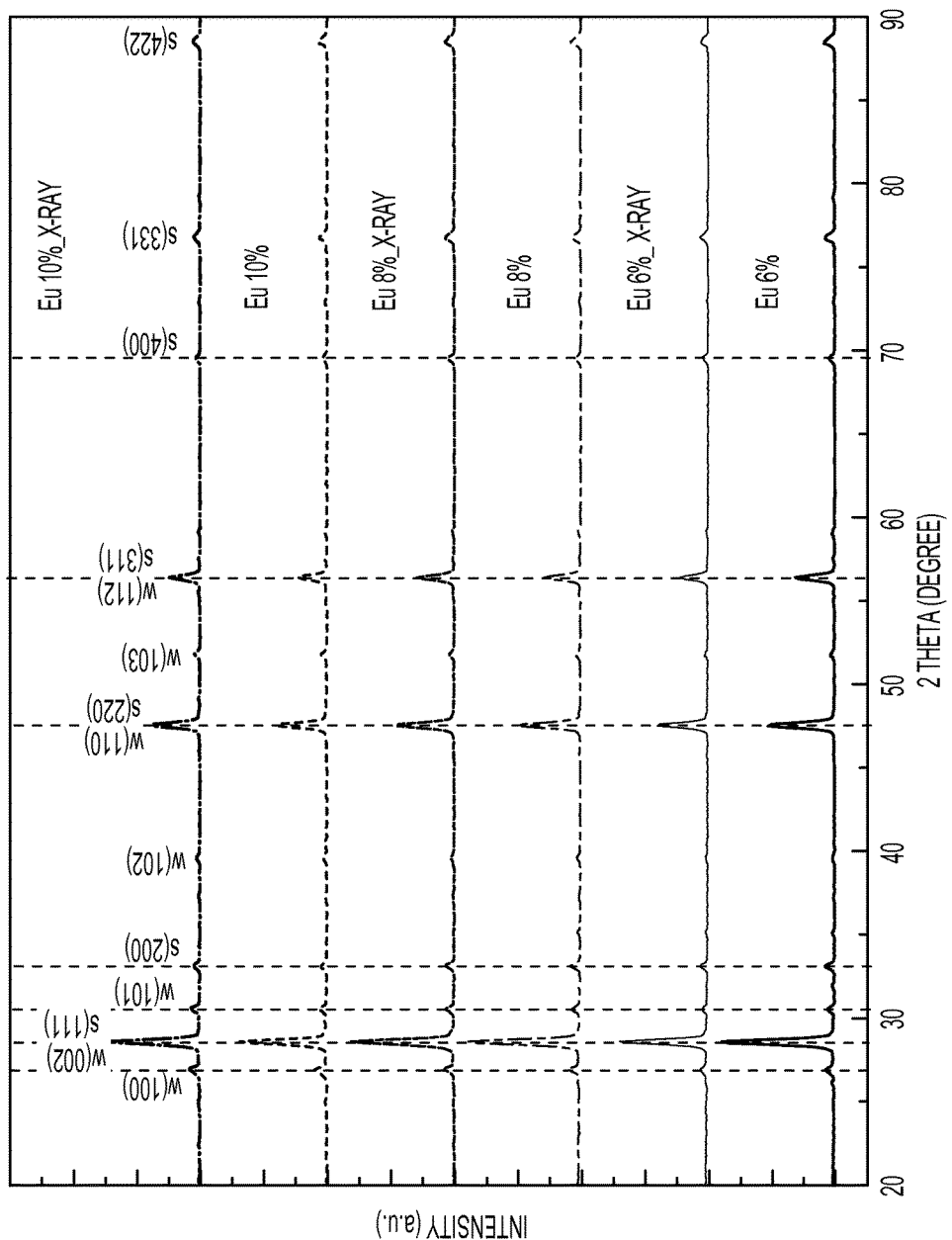
FIG. 5 shows X-ray diffraction patterns of ZnS:Mn,Eu phosphors before and after radiation treatment. Several main standard peak positions of pure sphalerte ZnS (JCPDS 05-0566) and wurtzite ZnS (JCPDS 36-1450) are displayed in dash lines for comparison purpose.

In order to study possible mechanism of the 420 nm fluorescence quenching by radiation, the crystal structures of sample A, B, and C before and after X-ray treatment using XRD measurement were studied (FIG. 5). The diffraction peaks are indexed with the lattice planes respectively as displayed on the top of the figure. Both ZnS wurtzite(w) and sphalerte(s) phases are observed for all the samples. The measured peaks fit very well with standard X-ray diffraction peak positions of pure sphalerte ZnS (JCPDS, No. 05-0566) and wurtzite ZnS (JCPDS, No. 36-1450). No impurity phases are observed so that $Mn^{2+}$ and $Eu^{2+}$ are doped into ZnS host. There is almost no difference in the XRD patterns before and after X-ray treatment, indicating that the ZnS:Mn,Eu crystal structure is hardly affected by radiation treatment or $Eu^{2+}$ doping.

Figure 6:
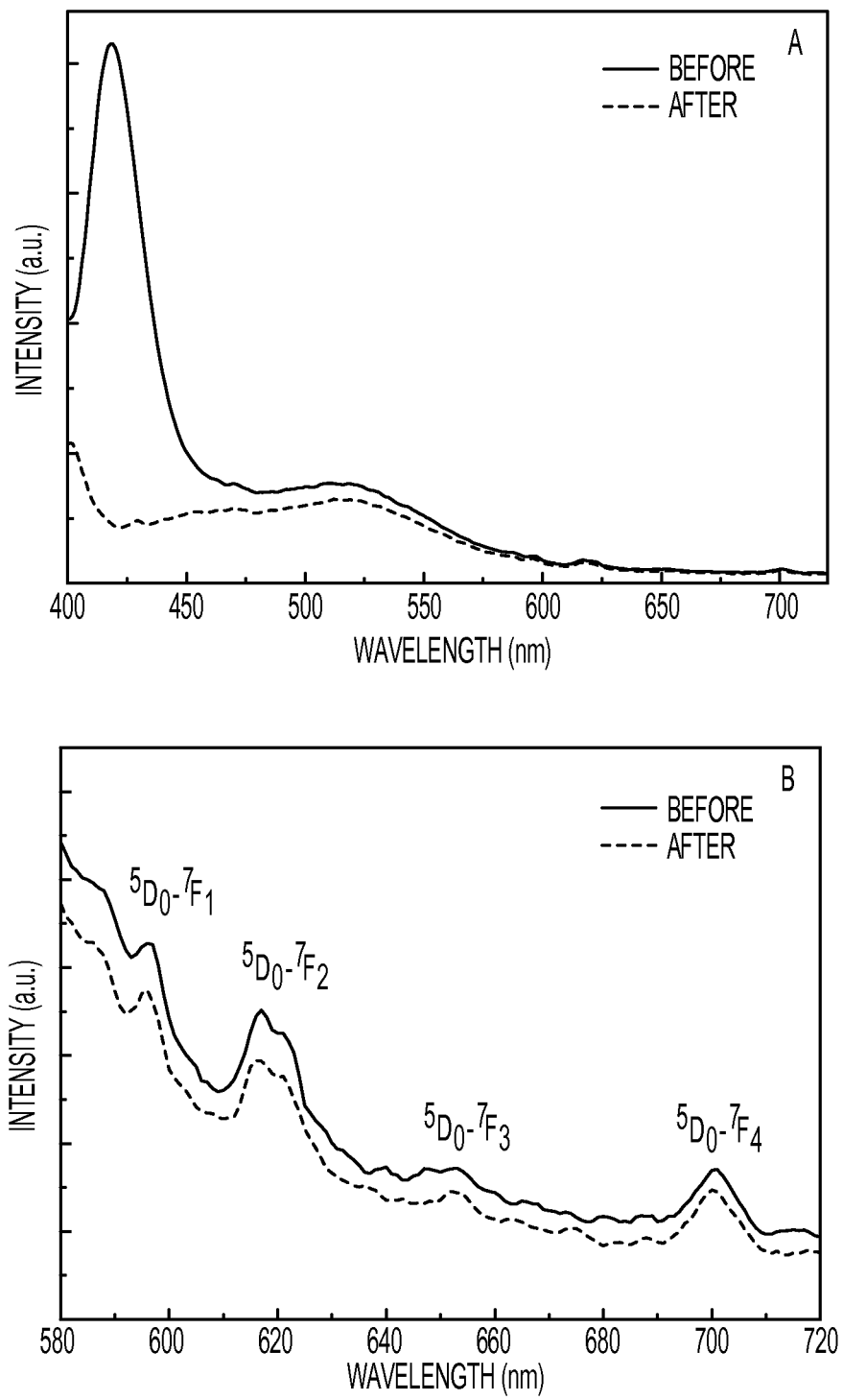
FIG. 6A to 6B shows (A) Emission spectra of ZnS:Eu (10%) before and after heating at 150 C.° for 3 hours (excitation at 390 nm). The plot (B) is an enlarged plot of (a) in the range from 580 nm to 720 nm.
Figure 7:
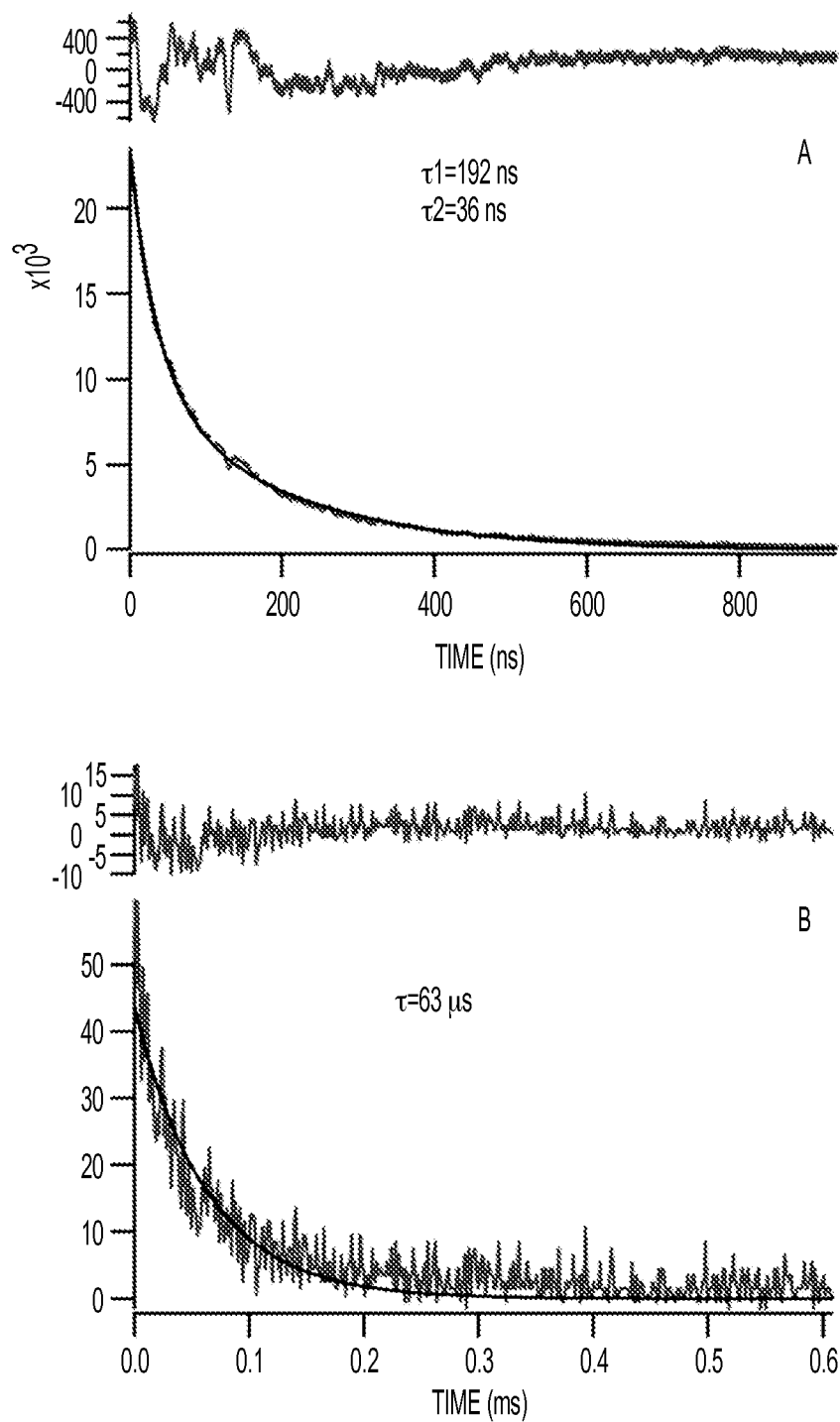
FIGS. 7A to 7B shows the luminescence decay curve of 420 nm emission of ZnS: Eu,Mn under excitation at 355 nm. The decay curve was recorded (A) by the digital oscilloscope (Tektronix, TDS 2022C) and (B) by the multichannel scalar. The fitting curves are shown in black curves. Residuals for the fittings are shown above the decay curves respectively.

For further investigation, heat treatment in air was conducted on the ZnS:Eu(10%) which has the most intense 420 nm emission. FIG. 6A shows the emission spectra of the sample before and after the heat treatment (heating at 150 C.° for 3 hours in air). After the treatment, the 420 nm emission is almost disappeared, meanwhile the 460 nm and 520 nm emissions are also decreased in intensity. The heat treatment phenomenon suggests that these emissions are likely from some defects because it is very common that defects are bleached by heat treatment. Besides, we noticed four characteristic emissions of $Eu^{3+}$ at 596 nm, 617 nm, 652 nm and 699 nm, which are corresponding to the transitions of $Eu^{3+}$ excited $^5D_0$ level to the $^7F_J$ (J=1, 2, 3 and 4) levels, respectively. These $Eu^{3+}$ emissions are very weak and there are almost no changes in intensity before and after the heating (FIG. 6B). This indicates that no $Eu^{2+}$ ions were oxidized to $Eu^{3+}$ during the heat treatment at 150° C. in air. It also indicates that the 420 nm emission is from some defects rather than the intra-ion d-f transition from $Eu^{2+}$ in ZnS:$Eu^{2+}$.

X-ray irradiation may generate different effects in materials. It has been reported that $Eu^{2+}$ can be converted/oxidized to $Eu^{3+}$ upon X-ray irradiation in CaF:Eu and fluoroaluminate glasses. The process is suggested through either direct X-ray ionization or tapping holes. On the other hand, X-ray irradiation has also been found able to reduce $Eu^{3+}$ to $Eu^{2+}$ in BaFBr:Eu phosphors and phosphate glass. Meanwhile, both formation of X-ray-induced $(Eu^{2+})^+$ and $(Eu^{3+})^-$ ions were reported in phosphate glasses, in which the radiation-induced $(Eu^{2+})^+$ or $(Eu^{3+})^-$ ions have different local environment to the chemically created $Eu^{2+}$ or $Eu^{3+}$ ions. What is more, X-ray irradiation can induce defects. In our case, as the 420 nm emission is demonstrated as a defect emission that is largely enhanced by $Eu^{2+}$ doping, both X-ray-induced $(Eu^{3+}$ and defects are possible. The former can reduce the effective $Eu^{2+}$ concentration by changing $Eu^{2+}$ to $(Eu^{3+}$ and the latter affects original defects, they both quench the 420 nm defect emission. Therefore, it is reasonable that the defect emission at 420 nm is highly sensitive to radiation and can be used for radiation detection and dosimetry.

A very intense violet emission at 420 nm in ZnS host has been observed for the first time. This emission as well as the other two emissions at 460 nm and 520 nm is significantly related to $Eu^{2+}$ doping in ZnS. The 420 nm fluorescence only exists at certain $Eu^{2+}$ concentrations. X-ray irradiation quenches its emission intensity but does not affect the Mn emission at 583 nm. The fluorescence intensity quenching is suggested due to X-ray induced $(Eu^{2+})^+$ and defects. The FIR of the two emissions in ZnS:Mn,Eu may provide a new, sensitive and reliable method for radiation detection.

Figure 8:
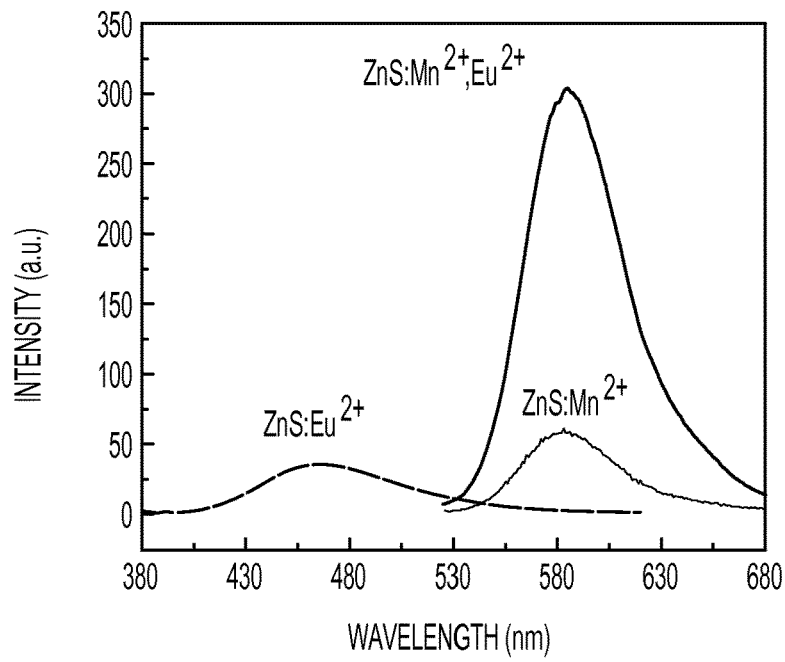
FIG. 8 shows the photoluminescence spectra of ZnS:Mn, ZnS:Eu and ZnS:Mn, Eu.
Figure 9:
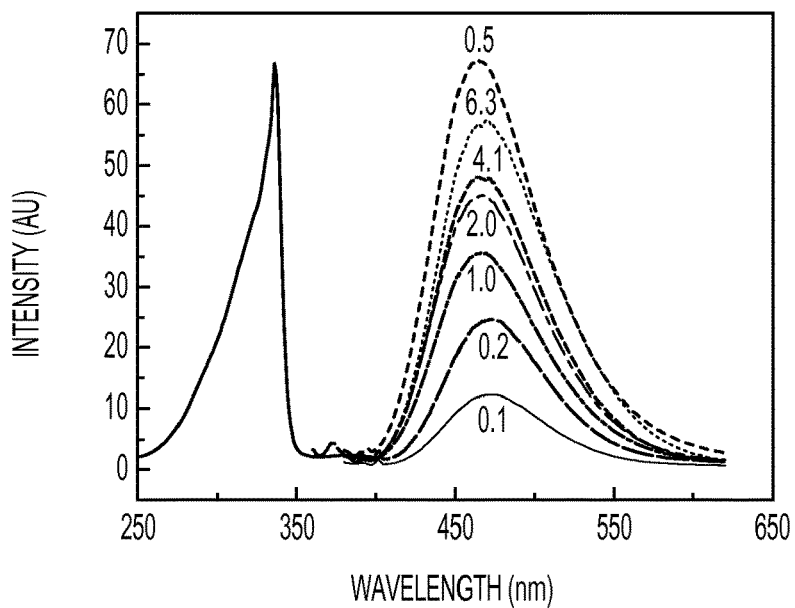
FIG. 9 shows the photoluminescence spectra of ZnS:Eu at different Eu2+ concentrations where the excitation is carried out at 330 nm.
Figure 10:
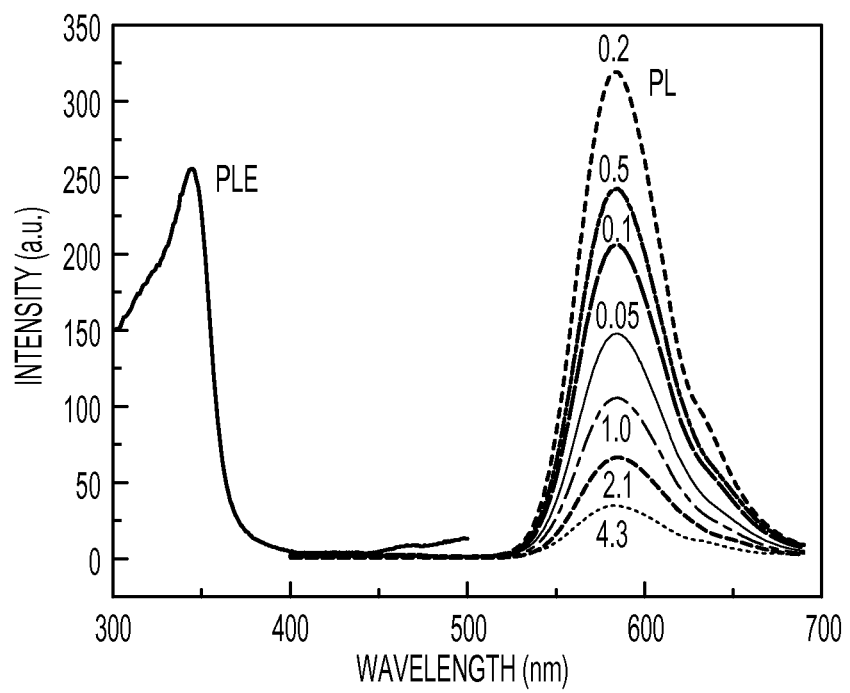
FIG. 10 shows the photoluminescence spectra of ZnS: Mn,Eu at different Eu concentrations where the excitation is carried out at 330 nm.
Figure 11:
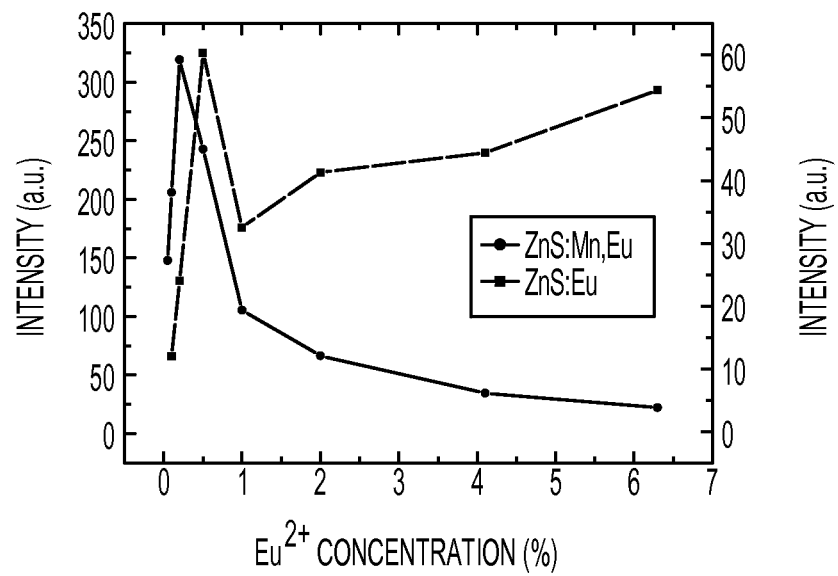
FIG. 11 shows a comparison of ZnS:Eu and ZnS:Mn,Eu photoluminescence intensities with Eu concentration.

The emission spectra of ZnS:Mn (0.5%), ZnS:Mn(0.5%), Eu(0.2%) and ZnS:Eu (0.2%) are shown in FIG. 8. The emission peaking at 595 nm in ZnS:Mn and ZnS:Mn,Eu is from the $^4T_1(^4G)$–$^6A_1(^6S)$ transition of $Mn^{2+}$. However, the luminescence intensity of ZnS:Mn,Eu is more than 5 times stronger than that of ZnS:Mn even though the concentration of $Mn^{2+}$ is the same in the two samples. This implies that co-doping of $Eu^{2+}$ in ZnS:Mn,Eu can enhance the emission of $Mn^{2+}$. The luminescence properties of ZnS:Eu and ZnS:Mn,Eu as a function of $Eu^{2+}$ concentration are shown in FIGS. 9 and 10, respectively. ZnS:Eu has a blue emission at 475 nm which is likely from defects. In bulk ZnS:Eu, no intra-ion transition of $Eu^{2+}$ is observed because the excited states of $Eu^{2+}$ are degenerate with the continuum of the ZnS conduction band. The intra-ion d-f transition from $Eu^{2+}$ in ZnS:$Eu^{2+}$ can be observed only in ZnS:$Eu^{2+}$ nanoparticles with size smaller than 3.5 nm Both the blue emission intensity in ZnS:Eu and the orange emission intensity of $Mn^{2+}$ in ZnS:Mn,Eu are highly dependent on the concentration of $Eu^{2+}$ (FIGS. 8, 9 and 10). For $Eu^{2+}$ concentrations less than 1%, the variation trends in ZnS:Eu and ZnS:Mn,Eu are similar, while for concentrations higher than 1%, the blue emission of ZnS:Eu increases in intensity with increasing $Eu^{2+}$ concentration, while for ZnS:Mn,Eu, the change is just the opposite (FIG. 11). It is possible that at concentrations above 1% the nature of the defects giving rise to the blue emission changes. This results in additional blue emission intensity as the concentration of $Eu^{2+}$ increases while the Mn emission decreases either due to concentration quenching or reduced coupling to the defect-related emission.

Figure 12:
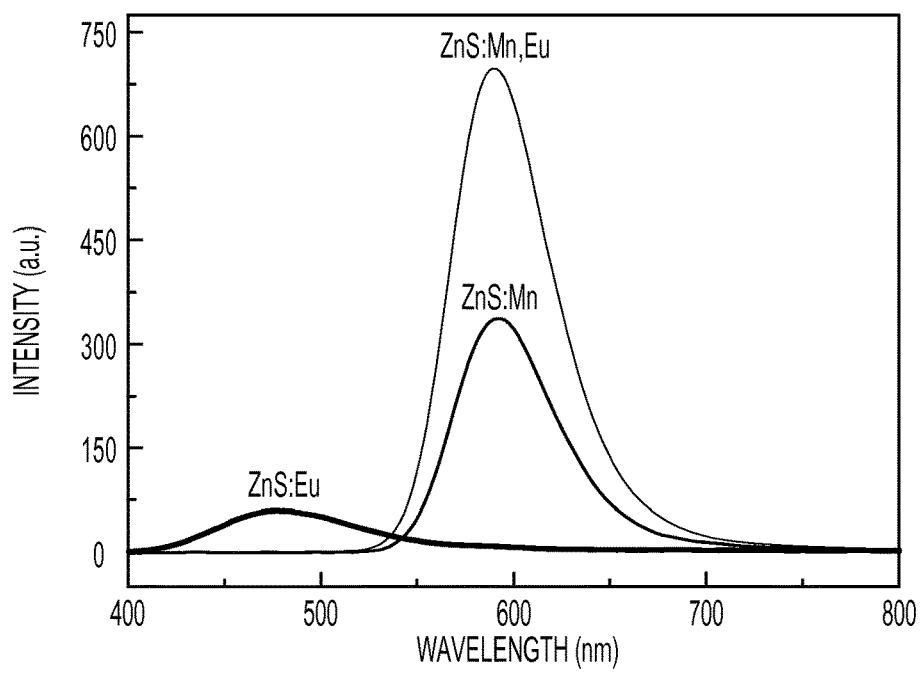
FIG. 12 shows an X-ray luminescence spectra of ZnS:Mn (0.5%), ZnS:Eu (0.2%) and ZnS:Mn (0.5%), Eu (0.2%)
Figure 13:
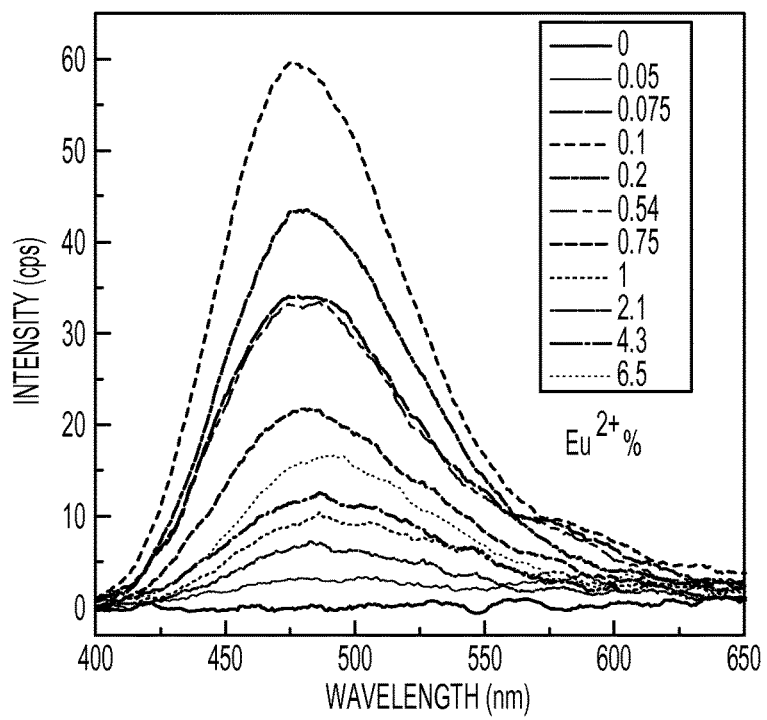
FIG. 13 shows an X-ray luminescence spectra of ZnS:Eu at different Eu concentrations.
Figure 14:
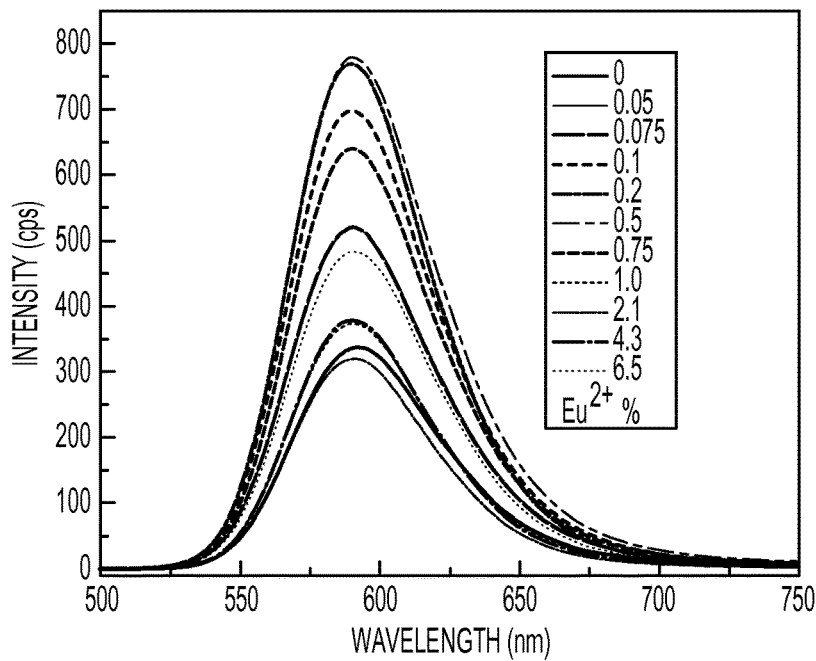
FIG. 14 shows an X-ray luminescence spectra of ZnS: Mn,Eu at different Eu concentrations.
Figure 15:
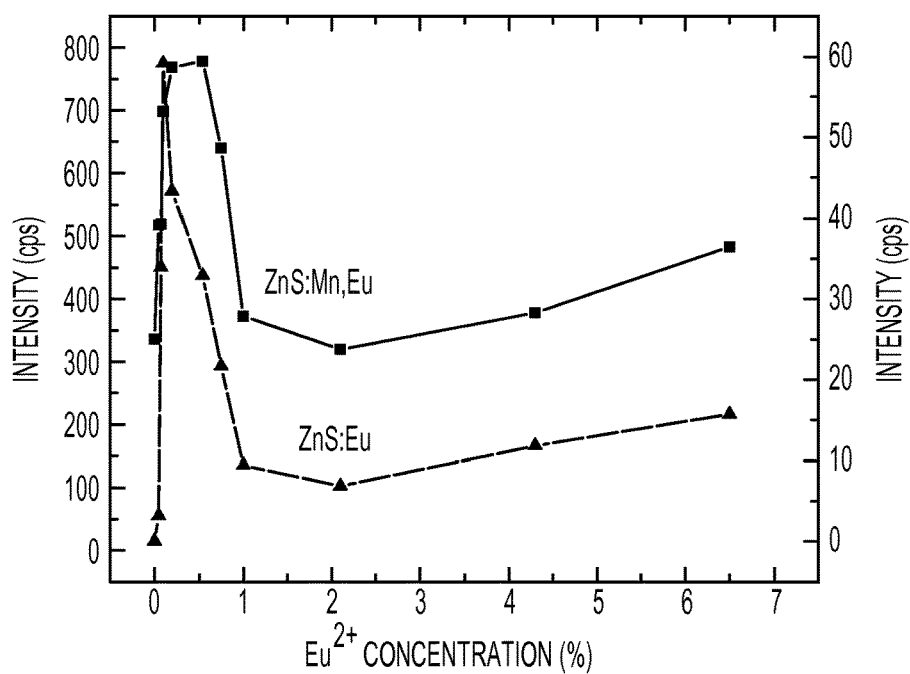
FIG. 15 shows a comparison of X-ray induced luminescence emission intensity on $Eu^{2+}$ concentration.

In this instance, X-ray luminescence is luminescence excited by X-ray, so it is also called X-ray excited luminescence. The co-doping of $Eu^{2+}$ in ZnS:Mn results in not only photoluminescence enhancement but also in X-ray luminescence as shown in FIG. 12. The X-ray emission at 595 nm in FIG. 12 is attributed to the $^4T_1(^4G)$–$^6A_1(^6S)$ transition of $Mn^{2+}$ analogous to the photoluminescence emission. However, the X-ray luminescence intensity of ZnS:Mn,Eu is a factor of 2.5 times stronger than that of ZnS:Mn for identical $Mn^{2+}$ concentrations. This implies that $Eu^{2+}$ co-doping in ZnS:Mn,Eu can enhance the $Mn^{2+}$ X-ray emission. As in photoluminescence, ZnS:Eu has a blue X-ray luminescence band peaking at 475 nm which is attributed to defects as discussed above. Both the blue emission intensity in ZnS:Eu and the orange emission intensity of $Mn^{2+}$ in ZnS:Mn,Eu are highly dependent on the concentration of $Eu^{2+}$ (FIGS. 13, 14, 15). However, the variation of the X-ray luminescence intensities with $Eu^{2+}$ concentration is somewhat different from that of the photoluminescence. In the concentration range studied, the blue emission intensity in ZnS:Eu follows the orange emission intensity in ZnS:Mn,Eu. Samples prepared with even higher Eu concentrations of 8% and 10% showed decreased emission intensity, presumably due to concentration quenching.

Figure 16:
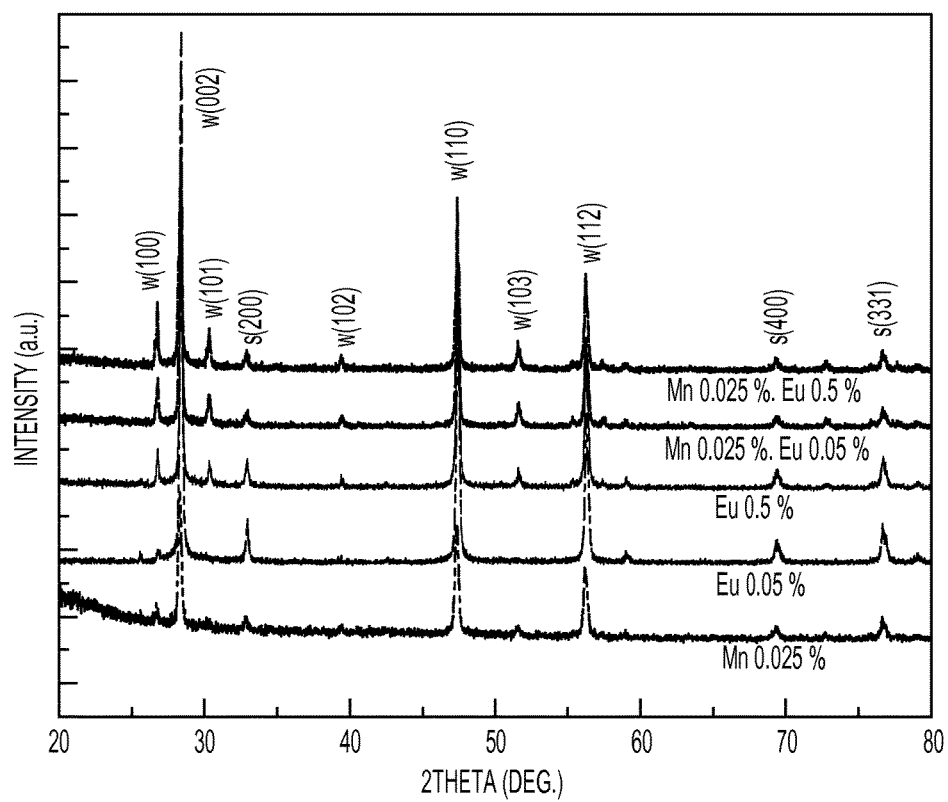
FIG. 16 shows powder XRD patterns of ZnS:Mn, ZnS:Eu and ZnS:Mn,Eu.

To investigate the possible mechanisms for the enhancement, we measured the crystal structures of the samples by XRD, their phonon structures by Raman spectroscopy, the valence states of Mn and Eu by ESR and the luminescence dynamics. These studies provide detailed information about the crystal structures, surface properties, compositions and luminescence processes that are critical for the understanding of the luminescence enhancement. The XRD patterns of ZnS:Eu, ZnS:Mn and ZnS:Mn,Eu are shown in FIG. 16 and the XRD lines from different planes are labeled. Both Wurtzite (W) and Sphalerite (S) phases are observed in the samples but the wurtzite phase is dominant in all the samples based on the XRD line intensities. No impurity phases are observed implying that $Eu^{2+}$ and $Mn^{2+}$ ions are doped into the crystals. The results show that co-doping with $Eu^{2+}$ does not appreciably change the ratio of the two phases in the samples. Therefore we may exclude the possibility that $Eu^{2+}$ co-doping affects the phosphor crystal structures and is responsible for the luminescence enhancement.

Figure 17:
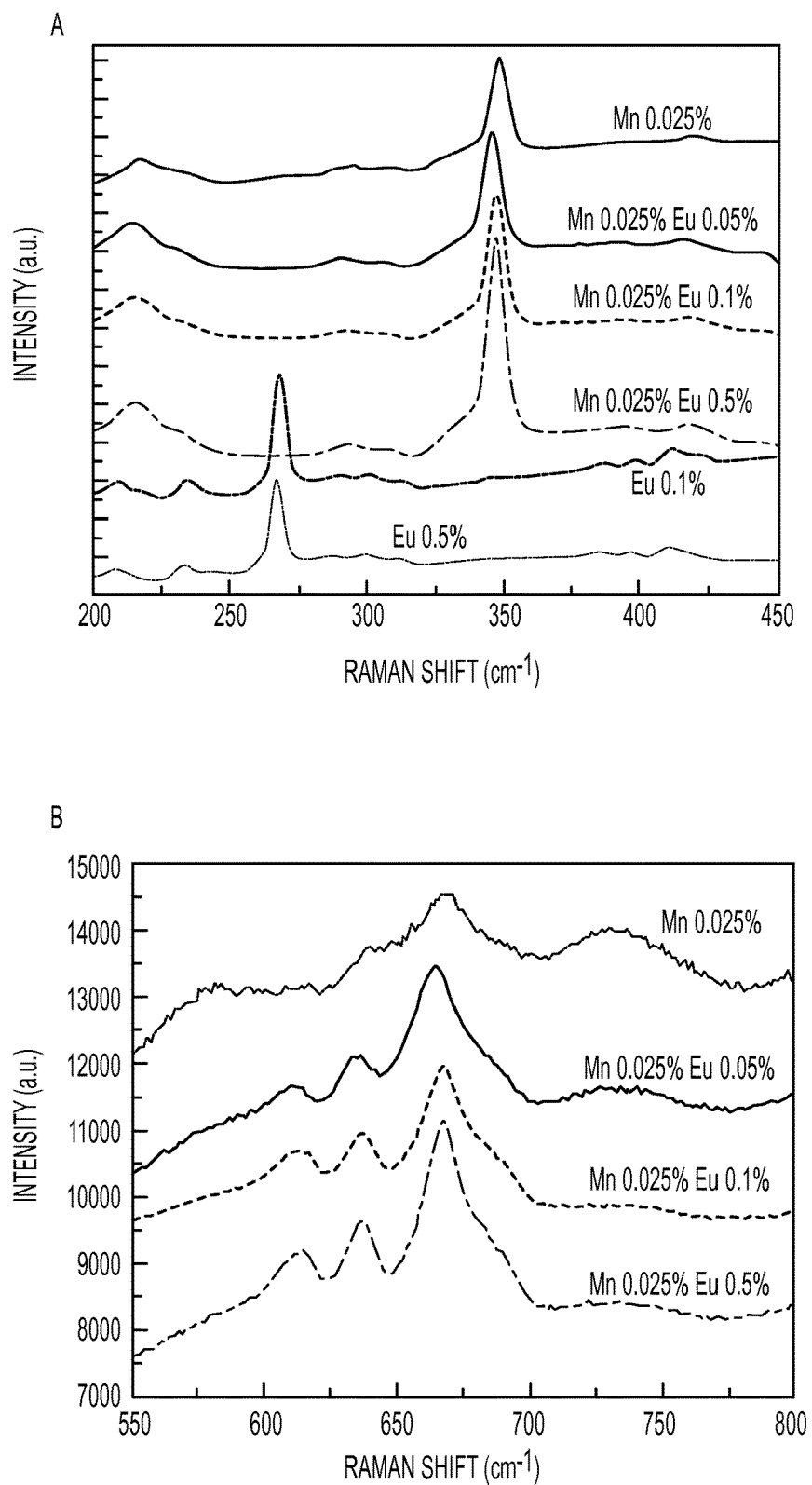
FIGS. 17A and 17B shows Raman spectra of ZnS:Mn, ZnS:Mn,Eu, and ZnS:Eu for various concentration of Eu.

FIGS. 17A and 17B shows the Raman spectra of ZnS:Eu, ZnS:Mn and ZnS:Mn,Eu with different doping concentrations. As the samples contain both Wurtzite (W) and Sphalerite (S) phases of ZnS, it is likely that the Raman signals derive from both phases. However, it is difficult to distinguish between Raman signals of the two phases because most of their Raman frequencies are very similar. For example, the $T_2(TO)$ phonon frequency of sphalerite ZnS is at 271 $cm^{-1}$ while the $A_1(TO)$ phonon frequency of wurtzite ZnS is at 273 $cm^{-1}$, and the $T_2(LO)$ phonon frequency of sphalerite ZnS is at 351 $cm^{-1}$ while the $A_1(LO)$ phonon frequency of wurtzite ZnS is also at 351 $cm^{-1}$. As the wurtzite phase is dominant in our samples, we assign the Raman signals to wurtzite ZnS. In the first-order Raman spectra in FIG. 10a, the Raman peak at 215 $cm^{-1}$ is assigned to $[TO-TA]_x$ and the peak at 233 $cm^{-1}$ is attributed to $[La+TA]_\Sigma$ by comparing with the Raman spectra of ZnS:Cu,Cl phosphors. For ZnS:Mn, both the peaks at 215 and 233 $cm^{-1}$ are very weak. When $Eu^{2+}$ is co-doped into ZnS:Mn,Eu, both peaks become stronger as the concentration of $Eu^{2+}$ increases, while in ZnS:Mn and ZnS:Mn,Eu, the $[TO-TA]_x$ peak at 215 $cm^{-1}$ is stronger in intensity than the $[La+TA]_\Sigma$ peak at 233 $com^{-1}$. In ZnS:Eu, the $[TO-TA]_x$ peak shifts to 208 $cm^{-1}$ and the $[TO-TA]_x$ peak at 208 $cm^{-1}$ is weaker in intensity than the $[La+TA]_\Sigma$ peak at 233 $cm^{-1}$. The Raman peak at 267 $cm^{-1}$ is attributed to $A_1$ (TO) and the 347 $cm^{-1}$ is from the $A_1(LO)$ phonon of wurtzite ZnS. The $A_1$ (TO) phonon is only observed in ZnS:Eu but not in ZnS:Mn or ZnS:Mn,Eu. On the contrary, the $A_1(LO)$ phonon is only observed in ZnS:Mn samples but not in ZnS:Eu samples. The $A_1(LO)$ phonon frequency is shifted from 349 $cm^{-1}$ in ZnS:Mn to 347 $cm^{-1}$ in ZnS:Mn,Eu and the Raman intensity increases with the increase of the co-doping concentration of $Eu^{2+}$.

The second-order Raman spectra are shown in FIG. 17B. For ZnS:Eu samples, no second-order Raman peaks are observed in the range of 550-800 $cm^{-1}$. Four Raman peaks are observed in ZnS:Mn at 581, 634, 669 and 730 $cm^{-1}$, respectively. By comparing to the second-order Raman spectra of ZnS, the 634 $cm^{-1}$ is from the combination of TO+LO modes and the 669 $cm^{-1}$ is from the overtones of the LO mode. The 581 and 730 $cm^{-1}$ peaks are new phonons observed in ZnS:Mn. The 730 $cm^{-1}$ peak can be attributed to the E2 mode in ZnS and the most likely origin of the 581 $cm^{-1}$ is from a ZnO impurity because ZnO has a Raman peak at 583 $cm^{-1}$ which is attributed to the $E_1(LO)$ mode. It is highly possible that some oxygen impurity in the ZnS lattice is responsible for the formation of trace ZnO in ZnS:Mn phosphors. When $Eu^{2+}$ is doped into ZnS:Mn, a new peak appears at 612 $cm^{-1}$ which is attributed to the overtone of the TO mode, while the two new peaks of ZnS:Mn at 581 and 730 $cm^{-1}$ decrease largely and disappear with the increase of $Eu^{2+}$ concentration. The three Raman peaks at 612, 634 and 669 $cm^{-1}$ in ZnS:Mn,Eu increase in intensity with increasing $Eu^{2+}$ concentration. These phenomena indicate that the co-doping of $Eu^{2+}$ into ZnS:Mn does affect and modify the phonon dynamics of the host ZnS materials as reported in Raman spectra of ZnS:Mn and ZnS:Cu,Cl phosphors. Consequently, this would influence the luminescence processes and the emission efficiency of $Mn^{2+}$ in ZnS:Mn,Eu phosphors. The modification of the host material phonon properties by doping with $Eu^{2+}$ could be one of the key reasons leading to the luminescence enhancement observed in ZnS:Mn,Eu phosphors.

Figure 18:
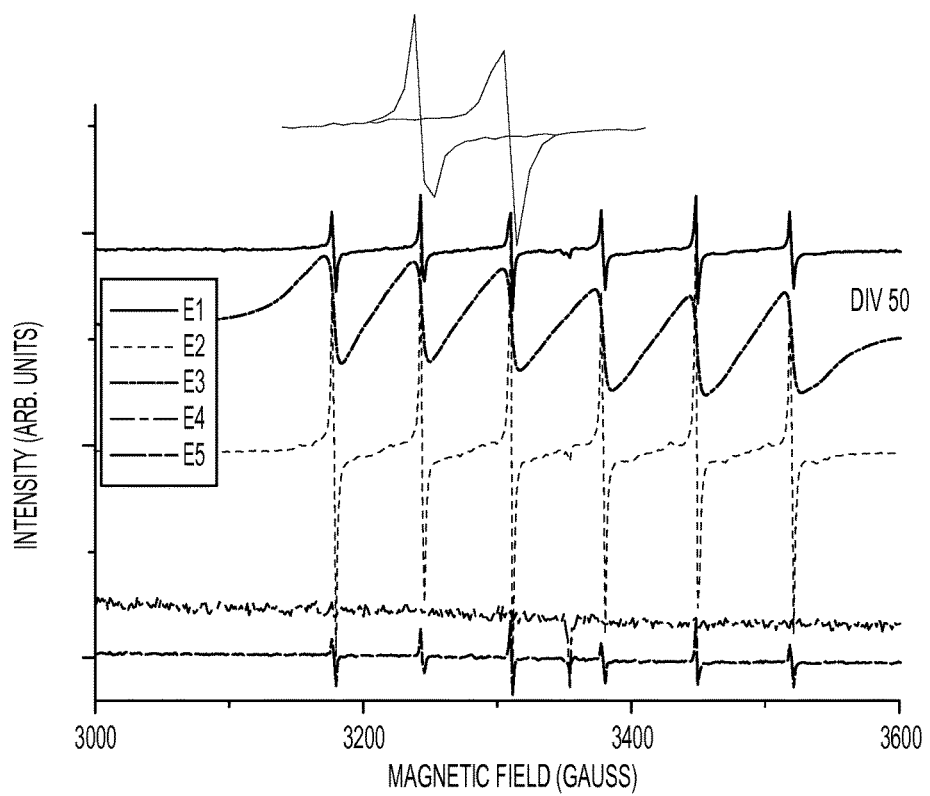
FIG. 18 shows ESR spectra of ZnS:Eu; E1=ZnS:Eu 0.05%, E2=ZnS:Eu 0.1%, E3=ZnS:Eu 0.5%, E4=ZnS:Eu 1%, E5=ZnS:Eu 6%.
Figure 19:
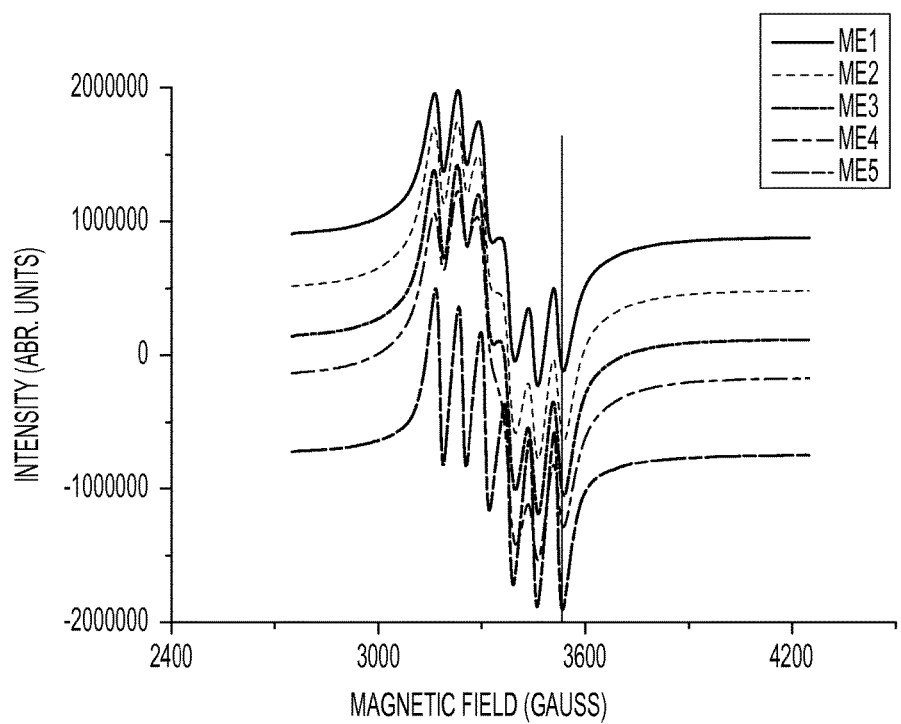
FIG. 19 shows a ESR spectra of ZnS:Mn,Eu. In all samples, the concentration of Mn is 0.025%. The concentrations of Eu are 0.05, 0.1, 0.5, 1.0 and 6.0% for samples of ME1, ME2, ME3, ME4, and ME5.

ESR spectra of Eu doped ZnS are shown in FIG. 18 and the spectra of Mn, Eu co-doped ZnS are shown in FIG. 19. The ESR spectrum of $Eu^{2+}$ in ZnS consists of six lines as expected from $Eu^{2+}$ which is an ion with a half-filled 4f shell in the $^8S_{7/2}$ state. This $4f^7$ ion behaves as an effective spin ½ system. The six lines observed arise from the nuclear 5/2 spin of $^{151}Eu^{2+}$ (47.8%) and $^{153}Eu^{2+}$ (52.2%). The intensities of the lines are scaled to the mass for quantitative analysis. However, they do not seem, at first glance, to follow the same trend as observed in the optical measurements. There is a fivefold increase in intensity when comparing 0.05% to 0.5% $Eu^{2+}$ and an eight fold decrease in intensity when comparing 0.5% to 6.0%. These two spectra have consistent scaling with concentration of $Eu^{2+}$. Also, the pattern of line intensities and line shapes are similar for 0.05%, 0.5% and 6.0% $Eu^{2+}$ doping. The intensity at 0.1% $Eu^{2+}$ was divided by 50 to fit on the composite graph and there is extremely low intensity at 1.0% $Eu^{2+}$. The first spectrum in FIG. 18 shows the second and third lines expanded illustrating the differing intensity, line shape and linewidth that account for the appearance of the spectrum. The line shape accounts for the varying intensities of the lines in each spectrum. The ESR spectrum is represented by the magnetic hyperfine, nuclear quadrupole, and nuclear Zeeman interactions.

The ratio of the $^{153}Eu/^{151}Eu$ quadrupole moment and the magnetic moment are 2.54 and 0.442, respectively. The nuclear interactions are significant and contribute to the linewidth and lineshapes but not large enough to shift the entire spectrum to show resolved multiple spectra. The linewidth of the three similar spectra is five times smaller than that at 0.10% $Eu^{2+}$ doping. This increase in linewidth of the S state ion, which has sufficiently long lifetime at room temperature to be observed, suggests a decrease in the spin relaxation time and a change in the spin lattice relaxation. This is attributed to crystal symmetry and dopant-dopant interaction or dopant lattice interaction. A more careful inspection of the spectra shows that there is a residual broad background in 0.1%, 0.5% and 1.0% $Eu^{2+}$ doped samples. This background is not observed in the 0.5% and the 6% $Eu^{2+}$, which implies that there is an environment giving rise to fast relaxation and that the relaxation time becomes shorter with concentration. The observation of a flat line at 6% indicates that the relaxation time is concentration dependent and too short for observation of any signal at room temperature.

The ESR spectra of ZnS:Mn,Eu co-doped spectra are shown in FIG. 19. These spectra are dominated by the $Mn^{2+}$ signal. This $^6S_{5/2}$ ground state ion gives rise to a sextet spectrum. The spectra are of equal intensity but seem to be of varying resolution. In this case the spectra are a combination of the transition ions occupying two or more sites. The bulk site gives rise to a broad background due to fast relaxation whereas the surface-type sites have slower relaxation. Co-doping with $Eu^{2+}$ competes with the $Mn^{2+}$ for the bulk sites resulting in reduced intensity of the broad spectrum. The sum of the $Mn^{2+}$ spectra show an apparent increased resolution as the $Eu^{2+}$ concentration is increased. However, the line widths of all the lines in the five spectra displayed are the same and indicates that the surface $Mn^{2+}$ are not involved in any perturbation of the energy transfer mechanism or spin in lattice relaxation. On the other hand, the $Mn^{2+}$ concentration remains constant and the surface composition does not change, so the $Mn^{2+}$ in the bulk or lattice must relax faster with increased concentration of $Eu^{2+}$. This faster relaxation of $Mn^{2+}$ is due to a relaxation pathway created by the presence of $Eu^{2+}$. The $Eu^{2+}$ increases the spin lattice relaxation, allowing for faster energy transfer. The $Eu^{2+}$ is not substituting for the $Mn^{2+}$, therefore there will be spin-spin interaction between the ions that are in the lattice. This interaction will account for some broadening of the $Mn^{2+}$ lines from the lattice centers and energy transfer between the two S state ions, which could result in the variance of optical emission intensity with concentration of $Eu^{2+}$.

Figure 20:
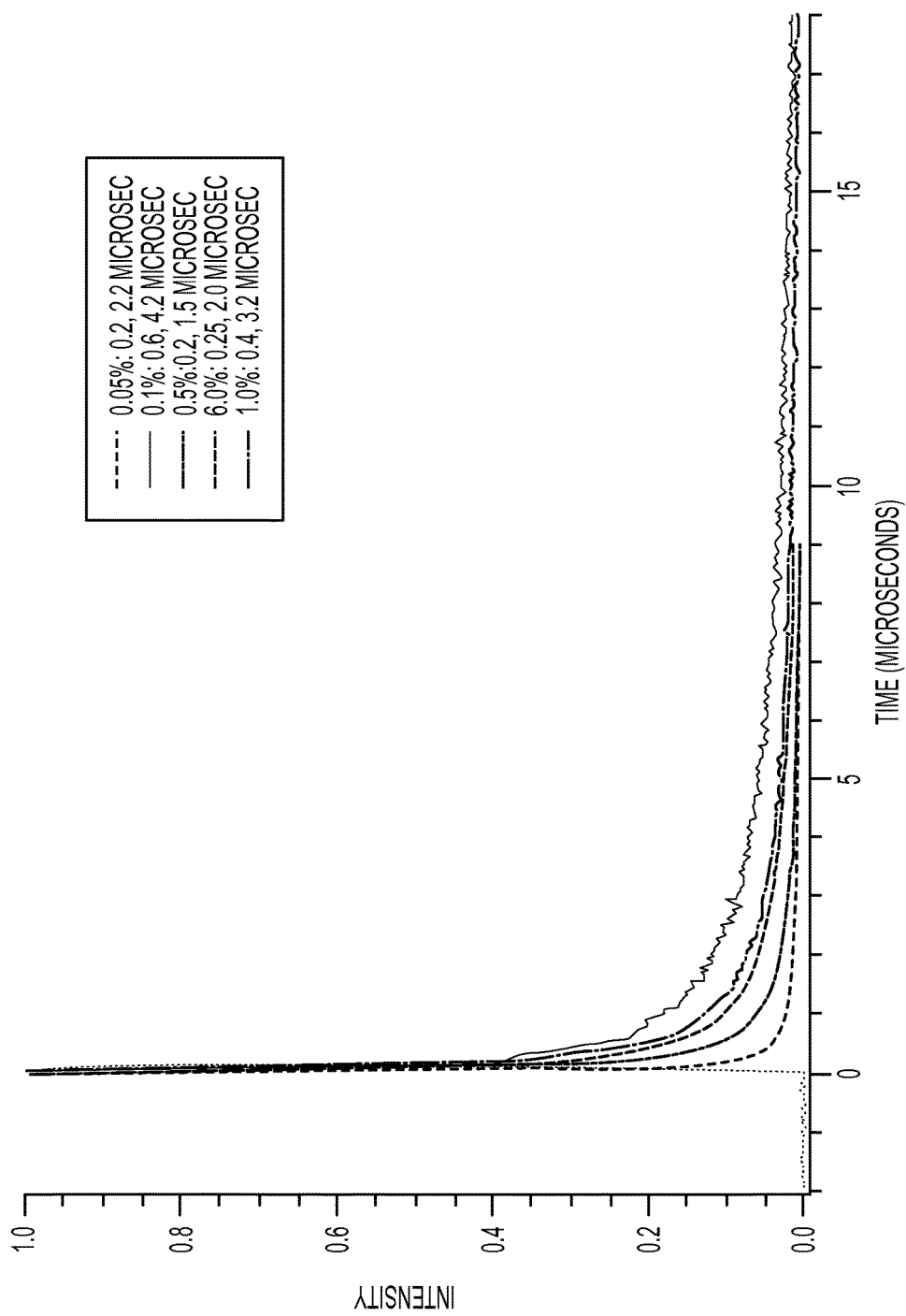
FIG. 20 shows luminescence lifetimes of $ZnS:Eu^{2+}$ with different $Eu^{2+}$ concentrations where the excitation is at 300 nm and emission is at 500 nm.

The $ZnS:Eu^{2+}$ luminescence decay curves with different $Eu^{2+}$ concentrations are shown in FIG. 20. The lifetimes of the ZnS:Eu emission at 500 nm all show multi-exponential behavior and must be fit with at least two time constants. The shorter lifetime is on the order of a few hundred nanoseconds while the longer lifetime varies between 1.5 to 3.2 µs. The shorter lifetime is significantly shorter and the longer lifetime longer than the typical lifetime of $Eu^{2+}$ which is 0.8 µs. This indicates that the blue emission from ZnS:Eu is not from the $4f^65d^1 \rightarrow 4f^7$ transition of $Eu^{2+}$. Therefore, the blue emission from ZnS:Eu is assigned to defect states.

Figure 21:
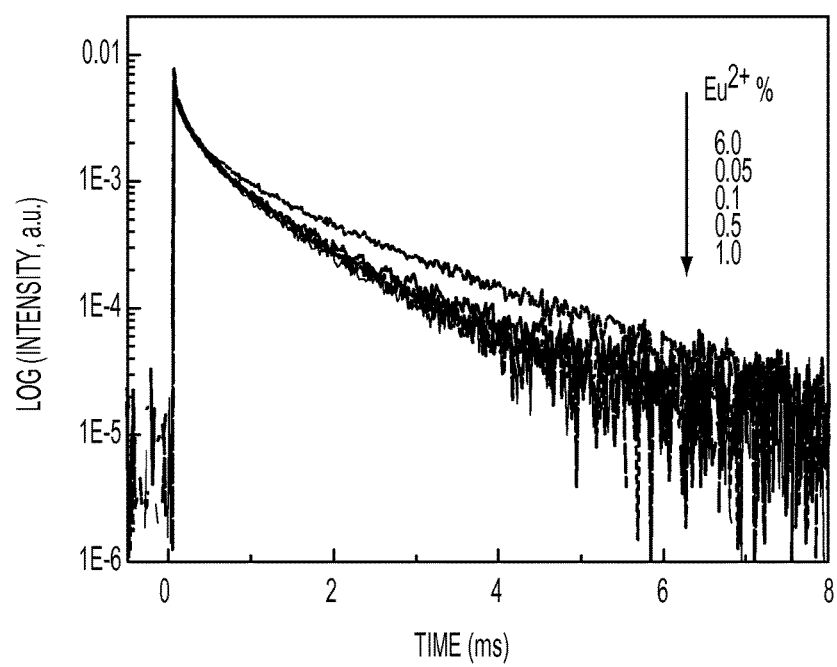
FIG. 21 shows $Mn^{2+}$ luminescence Lifetimes for ZnS: Mn,Eu with different $Eu^{2+}$ concentrations where the excitation is at 300 nm and emission is at 600 nm.
Figure 22:
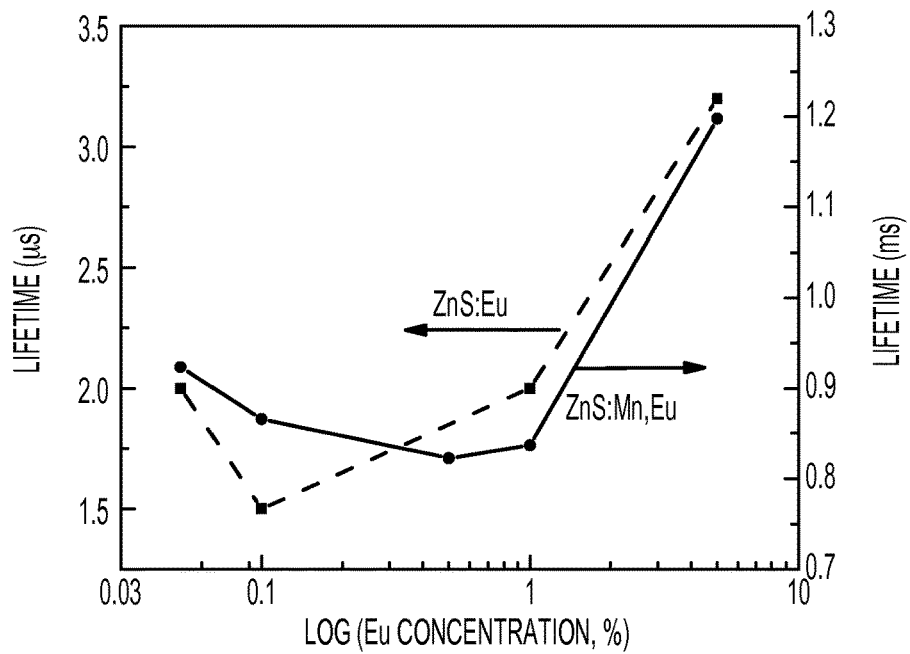
FIG. 22 shows lifetime versus $Eu^{2+}$ concentration.
Figure 23:
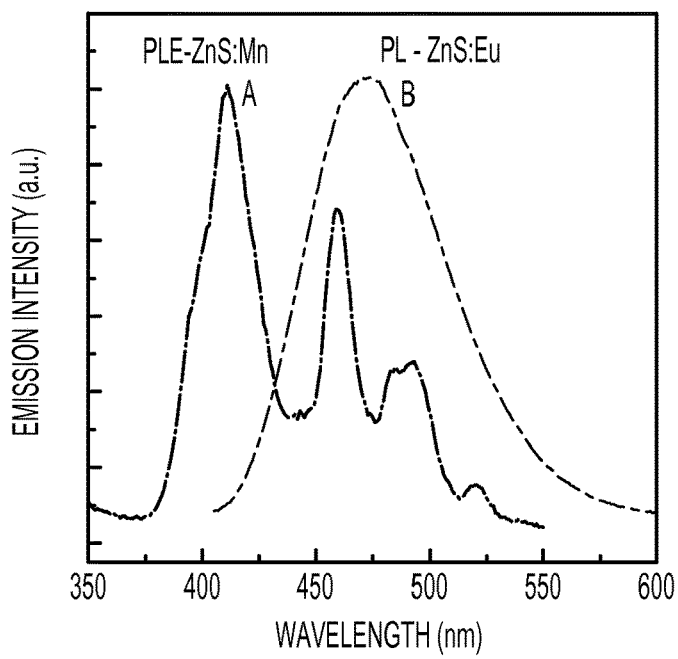
FIG. 23 shows a ZnS:Mn Photoluminescence excitation spectrum (monitored at 595 nm) and ZnS:Eu photoluminescence spectrum.

The luminescence decay curves of ZnS:Mn,Eu powder samples are shown in FIG. 21. In the ZnS:Mn,Eu samples, the concentration of $Mn^{2+}$ is kept constant at 2% while the $Eu^{2+}$ concentration varies from 0.05 to 6%. The luminescence decays are clearly multi-exponential likely reflecting fast contributions from the tail of the blue luminescence or emission from trap states. The longest lifetimes obtained from fits to the data in FIG. 21 are in agreement with the luminescence lifetime of $Mn^{2+}$ in ZnS:Mn phosphors. The results from FIG. 21 show that co-doping of $Eu^{2+}$ into ZnS:Mn,Eu does not appreciably change the $Mn^{2+}$ luminescence lifetime except for very high $Eu^{2+}$ doping of 6% which increases the $Mn^{2+}$ lifetime to 1.2 ms. The variation of the luminescence lifetimes with $Eu^{2+}$ concentration for the blue emission at 500 nm in $ZnS:Eu^{2+}$ and the emission of $Mn^{2+}$ at 600 nm in ZnS:Mn,Eu are displayed in FIG. 22. The change of the lifetime of the blue emission in ZnS:Eu with $Eu^{2+}$ concentration closely follows the $Mn^{2+}$ lifetime in ZnS:Mn,Eu. This indicates that the two emissions are closely correlated. It is noted the blue emission is observed in ZnS:Eu but not in ZnS:Mn,Eu. One reason may be that the blue emission band largely overlaps with the excitation bands of $Mn^{2+}$ in ZnS:Mn phosphors as shown in FIG. 23.

Thus, in ZnS:Mn,Eu phosphors, there can be efficient Forster energy transfer from the defect states to $Mn^{2+}$ in ZnS:Mn,Eu and this energy transfer suppresses the blue emission in the co-doped phosphors. This implies that the mean distance between the $Eu^{2+}$ and $Mn^{2+}$ is on the order of 10 nm or less. Energy transfer may likely be the main reason for the dependence of $Mn^{2+}$ emission on $Eu^{2+}$ concentration in ZnS:Mn,Eu. Due to energy transfer, as the $Eu^{2+}$ concentration increases the emission of $Mn^{2+}$ would also approach the strongest intensity. Thus, the dependence of $Mn^{2+}$ emission efficiency on $Eu^{2+}$ concentration in ZnS:Mn,Eu can be used to design and optimize ZnS:Mn,Eu phosphors for practical applications.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A luminescent phosphor material comprising ZnS:Mn that is doped with $Eu^{2+}$ ions.

2. The material of claim 1, wherein the material has the formula:
   $Zn_xS:Mn_yEu_z^{2+}$, where $0<x<1$; $0<y<1$; $0<z<1$ and $x+y+z$ equals 1, and y, z and y+z are present in an amount less than 0.5.

3. The material of claim 1 wherein, the concentration of the $Eu^{2+}$ ions ranges from 0.05% to 10%.

4. The material of claim 1 wherein, the concentration of the $Eu^{2+}$ ions is 0.2%.

5. The material of claim 1 wherein, the Eu ions enhances the photoluminescence of the phosphor material by 5.5 fold relative to ZnS:Mn.

6. The material of claim 1 wherein, the $Eu^{2+}$ ions enhances the X-ray luminescence of the phosphor material by 2.5 fold relative to ZnS:Mn.

7. A process for the preparation of a particle dispersion of zinc sulfide doped with manganese and europium ions (ZnS:Mn, $Eu^{2+}$) comprising the step of mixing powders of zinc sulfide, $MnCl_2$ and $EuCl_2$ and sintering in the presence of charcoal.

8. The process of claim 7 wherein, the mixture of the powders is sintered at 800° C.

* * * * *